(12) United States Patent
Zhao et al.

(10) Patent No.: US 10,797,378 B2
(45) Date of Patent: Oct. 6, 2020

(54) SMART WATCH AND ANTENNA SIGNAL PROCESSING CIRCUIT AND METHOD THEREOF

(71) Applicant: GOERTEK INC., Weifang, Shandong Province (CN)

(72) Inventors: Xin Zhao, Weifang (CN); Yuge Zhu, Weifang (CN)

(73) Assignee: GOERTEK INC., Shandong Province (CN)

( * ) Notice: Subject to any disclaimer, the term of this patent is extended or adjusted under 35 U.S.C. 154(b) by 0 days.

(21) Appl. No.: 16/471,314

(22) PCT Filed: Dec. 20, 2017

(86) PCT No.: PCT/CN2017/117506
§ 371 (c)(1),
(2) Date: Jun. 19, 2019

(87) PCT Pub. No.: WO2018/121379
PCT Pub. Date: Jul. 5, 2018

(65) Prior Publication Data
US 2020/0091588 A1 Mar. 19, 2020

(30) Foreign Application Priority Data

Dec. 29, 2016 (CN) .......................... 2016 1 1249920
Dec. 29, 2016 (CN) ...................... 2016 2 1468011 U
Dec. 29, 2016 (CN) ...................... 2016 2 1468881 U (51) Int. Cl.
*H04M 11/00* (2006.01)
*H01Q 1/24* (2006.01)
(Continued)

(52) U.S. Cl.
CPC ............. *H01Q 1/243* (2013.01); *G04G 17/06* (2013.01); *H01Q 1/273* (2013.01); *H04B 1/385* (2013.01);
(Continued)

(58) Field of Classification Search
CPC .......... H01Q 1/243; H01Q 1/273; H01Q 1/27; H04B 1/401; H04B 1/385; H04B 2001/3861; H04B 1/3827; G04G 17/06
(Continued)

(56) References Cited

U.S. PATENT DOCUMENTS

2015/0249916 A1* 9/2015 Schlub ................... H01Q 1/243
455/419
2018/0005224 A1* 1/2018 Binder ................. H04B 5/0075

FOREIGN PATENT DOCUMENTS

CN 102761640 A 10/2012
CN 103339796 A 10/2013
(Continued)

OTHER PUBLICATIONS

International Search Report (PCT/ISA/210) dated Feb. 26, 2018, by the State Intellectual Property Office of the P.R. China as the International Searching Authority for International Application No. PCT/CN2017/117506.
(Continued)

*Primary Examiner* — Marcos Batista
(74) *Attorney, Agent, or Firm* — Buchanan Ingersoll & Rooney PC (57) ABSTRACT

An antenna signal processing circuit of a smart watch, including: a sensor module, a microprocessor, an antenna body and an antenna tuning circuit having a plurality of tuning paths. The antenna tuning circuit is connected between a smart watch signal source and the antenna body, and the microprocessor is respectively connected to the
(Continued)

sensor module and the antenna tuning circuit. The sensor module sends a detected proximity sensing signal to the microprocessor. The microprocessor receives the proximity sensing signal, and obtains a controlling signal, to control the antenna tuning circuit to switch the tuning path and perform tuning processing on a signal from the smart watch signal source or the antenna body. A smart watch and an antenna signal processing method thereof are also provided.

11 Claims, 5 Drawing Sheets

(51) Int. Cl.
    *G04G 17/06*     (2006.01)
    *H01Q 1/27*     (2006.01)
    *H04B 1/3827*     (2015.01)
    *H04B 1/401*     (2015.01)

(52) U.S. Cl.
    CPC ..... *H04B 1/401* (2013.01); *H04B 2001/3861* (2013.01)

(58) Field of Classification Search
    USPC .......................................... 455/419; 370/338
    See application file for complete search history.

(56) References Cited

FOREIGN PATENT DOCUMENTS

| | | |
|---|---|---|
| CN | 104038176 A | 9/2014 |
| CN | 106159444 A | 11/2016 |
| CN | 106773625 A | 5/2017 |
| CN | 206480773 U | 9/2017 |
| CN | 206481297 U | 9/2017 |
| CN | 206557551 U | 10/2017 |
| JP | 2012239108 A | 12/2012 |
| JP | 5747179 B2 | 7/2015 |

OTHER PUBLICATIONS

Written Opinion (PCT/ISA/237) dated Feb. 26, 2018, by the State Intellectual Property Office of the P.R. China as the International Searching Authority for International Application No. PCT/CN2017/117506.

* cited by examiner

SMART WATCH AND ANTENNA SIGNAL PROCESSING CIRCUIT AND METHOD THEREOF

CROSS REFERENCE TO RELATED APPLICATIONS

This application is a U.S. National Stage entry under 35 U.S.C. § 371 based on International Application No. PCT/CN2017/117506, filed on Dec. 20, 2017, which was published under PCT Article 21(2) and which claims priority to three Chinese Patent Application No. 201611249920.2, 201621468011.3, 201621468881.0, all filed on Dec. 29, 2016. The subject matter of the priority applications are hereby incorporated herein in their entirety by reference.

TECHNICAL FIELD

The present disclosure relates to the field of the antenna design of smart watches, and in particular to a smart watch and an antenna signal processing circuit and method thereof.

BACKGROUND

During the antenna designing process of smart watches, the antenna performance is usually designed in a free space mode. In other words, the smart watch is placed in the free space to obtain the various parameters required in the antenna designing, and the antenna of the smart watch is designed based on those parameters. Thus, usually the antenna performance of the smart watch is determined after the antenna designing process of the smart watch is completed.

However, during the use of the smart watch, the using environment of the smart watch is significantly different from the free space environment. For example, when the smart watch is used, external factors such as the user's wrist and body may cause deterioration of the antenna performance, which ultimately affects the user experience.

SUMMARY

In view of the above problems, according to an object of the present disclosure, a smart watch and an antenna signal processing circuit and method thereof are provided to solve the problem that after the designing process of the smart watch is completed, the antenna performance is determined, which cannot adapt to different wearing states.

In order to achieve the above object, the technical solutions of the present disclosure are as follows.

In one aspect, the present disclosure provides an antenna signal processing circuit of a smart watch, wherein the antenna signal processing circuit comprises: a sensor module, a microprocessor, an antenna body, and an antenna tuning circuit having a plurality of tuning paths;

the antenna tuning circuit is connected between a smart watch signal source and the antenna body;

the microprocessor is respectively connected to the sensor module and the antenna tuning circuit;

the sensor module sends a detected proximity sensing signal to the microprocessor; and the microprocessor receives the proximity sensing signal, and obtains a controlling signal, to control the antenna tuning circuit to switch the tuning path and perform tuning processing on a signal from the smart watch signal source or the antenna body.

The present disclosure also provides an antenna signal processing circuit of a smart watch, wherein the antenna signal processing circuit comprises: a sensor module, a microprocessor, a switch element and an antenna body;

the antenna body comprises one signal feed point and at least two grounding points;

the switch element comprises a controlling end, a movable contact and at least two stationary contacts;

the signal feed point of the antenna body is connected to a smart watch signal source, each grounding point of the antenna body is connected to one corresponding stationary contact of the switch element, the movable contact of the switch element is grounded, and the microprocessor is respectively connected to the sensor module and the controlling end of the switch element;

the sensor module sends a detected proximity sensing signal to the microprocessor; and the microprocessor receives the proximity sensing signal, and obtains a controlling signal, to control the switch element to switch the stationary contact that is connected to the movable contact, to cause the antenna body to switch the grounding point which is grounded.

The present disclosure further provides another antenna signal processing circuit of a smart watch, wherein the antenna signal processing circuit comprises: a sensor module, a microprocessor, a switch element and an antenna body;

the antenna body comprises one grounding point and at least two signal feed points;

the switch element comprises a controlling end, a movable contact and at least two stationary contacts;

the grounding point of the antenna body is grounded, each signal feed point of the antenna body is connected to one corresponding stationary contact of the switch element, the movable contact of the switch element is connected to a smart watch signal source, and the microprocessor is respectively connected to the sensor module and the controlling end of the switch element;

the sensor module sends a detected proximity sensing signal to the microprocessor; and the microprocessor receives the proximity sensing signal, and obtains a controlling signal, to control the switch element to switch the stationary contact that is connected to the movable contact, to cause the antenna body to switch the signal feed point that is connected to the smart watch signal source.

In another aspect, the present disclosure provides a smart watch, wherein the smart watch comprises the antenna signal processing circuit described above, and the microprocessor in the antenna signal processing circuit detects a wearing state of the smart watch and adjusts an antenna system of the smart watch.

In still another aspect, the present disclosure provides an antenna signal processing method of a smart watch, wherein a sensor module, an antenna body and a smart watch signal source are provided in the smart watch, wherein the method comprises:

providing an antenna tuning circuit having a plurality of tuning paths, to cause each tuning path to correspond to one wearing state of the smart watch;

detecting a proximity sensing signal by using the sensor module, and judging a wearing state of the smart watch according to the proximity sensing signal; and switching the antenna tuning circuit to a corresponding tuning path according to the wearing state of the smart watch, and performing tuning processing on a signal of the smart watch signal source or the antenna body.

The advantageous effects of the present disclosure are as follows. By providing the sensor module, the wearing state of the smart watch is determined by using the proximity sensing signal detected by the sensor module, and then the antenna tuning circuit is switched to a tuning path corresponding to the wearing state, and/or the antenna body is switched to a grounding point corresponding to the wearing state, and/or the antenna body is switched to a signal feed point corresponding to the wearing state, so that the antenna system of the smart watch is adapted to the current wearing state, the antenna system is ensured to be automatically switched to the optimal state, thereby improving the quality of antenna signals and enhancing the user experience.

BRIEF DESCRIPTION OF DRAWINGS

The drawings are to provide a further understanding of the present disclosure and form a part of the specification. The drawings are intended to explain the present disclosure together with the following embodiments and are not to be construed as limiting the present disclosure. In the drawings.

DETAILED DESCRIPTION

In order to make the objects, technical solutions and advantages of the present disclosure clearer, the embodiments of the present disclosure will be further described in detail below with reference to the accompanying drawings.

At present, smart watches are increasingly thinner and smaller. Since the size of smart watches is limited, usually only one antenna is designed when designing the antenna system of smart watches. It is difficult for one antenna to satisfy different wearing states. Therefore, after the designing process of the smart watch is completed, the antenna performance is determined, and the antenna performance is poor under different wearing states.

In view of the above situation, based on the fact that the proximity sensing signal detected by the sensor module can distinguish wearing states of the smart watch, the general inventive concept of the present disclosure is providing a sensor module in the smart watch, using the proximity sensing signal detected by the sensor module to assist in detecting the wearing state of the smart watch, and controlling the antenna system of the smart watch to change according to the wearing state of the smart watch.

First Embodiment

Figure 1:
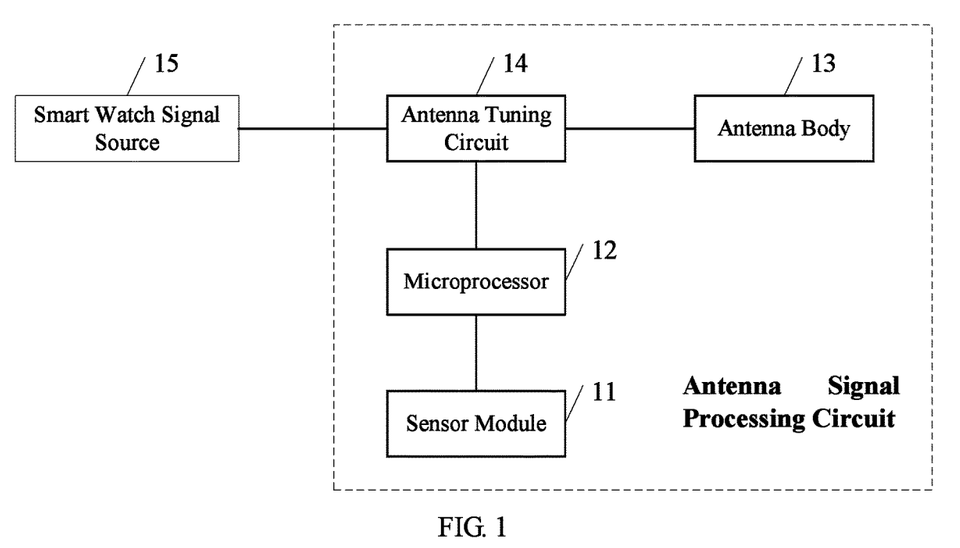
FIG. 1 is a block diagram of the structure of an antenna signal processing circuit according to a first embodiment of the present disclosure.

FIG. 1 is a block diagram of the structure of an antenna signal processing circuit according to the present embodiment. As shown in FIG. 1, the antenna signal processing circuit comprises: a sensor module 11, a microprocessor 12, an antenna body 13, and an antenna tuning circuit 14 having a plurality of tuning paths. The antenna tuning circuit 14 is connected between the smart watch signal source 15 and the antenna body 13, and the microprocessor 12 is connected to the sensor module 11 and the antenna tuning circuit 14 respectively.

The sensor module 11 sends a detected proximity sensing signal to the microprocessor 12. The microprocessor 12 receives the proximity sensing signal, and obtains a controlling signal according to the proximity sensing signal, to control the antenna tuning circuit 14 through the controlling signal to switch a tuning path and perform tuning processing on a signal from the smart watch signal source 15 or the antenna body 13.

The sensor module comprises one or more of a distance sensor, a temperature sensor and an acceleration sensor. Correspondingly, the proximity sensing signal is one or more of a distance signal, a temperature signal and an acceleration signal.

It should be noted that, in the present embodiment, one tuning path of the antenna tuning circuit corresponds to one wearing state of the smart watch. In implementing, the possible wearing state of the smart watch should be determined firstly (for example, by experimental statistics), and then the matching impedances of each tuning path of the antenna tuning circuit is determined, so that one tuning path of the antenna tuning circuit corresponds to one wearing state of the smart watch.

In the present embodiment, by providing the sensor module, the wearing state of the smart watch is determined by using the proximity sensing signal detected by the sensor module, and then the antenna tuning circuit is switched to a tuning path corresponding to the wearing state, so that the antenna system of the smart watch is adapted to the current wearing state.

In an implementation of the present embodiment, the antenna signal processing circuit further comprises a first switch element, wherein the first switch element comprises a controlling end, a movable contact and a plurality of stationary contacts.

The movable contact of the first switch element is connected to the smart watch signal source. Each stationary contact of the first switch element is connected to one corresponding tuning path of the antenna tuning circuit. The controlling end of the first switch element is connected to the microprocessor. The microprocessor controls the switching of the first switch element through the controlling end, so that the smart watch signal source is conductively connected to the corresponding tuning path.

By providing the switch element to assist the microprocessor in controlling the antenna tuning circuit, the circuit is simple to implement and has few components, and will not occupy too much installation space of the smart watch.

In actual uses, the antenna signal processing circuit further comprises a radio frequency circuit and a baseband processing circuit. The radio frequency circuit is respectively connected to the baseband processing circuit and the movable contact of the first switch element. The baseband processing circuit is connected to the smart watch signal source. The baseband processing circuit, the radio frequency circuit, the antenna tuning circuit and the antenna body form a radio frequency path of an antenna signal. The transmission signal of the smart watch signal source is transmitted through the radio frequency path, and the antenna signal received by the antenna body is transmitted to the smart watch through the radio frequency path.

In order to further improve the antenna performance in different wearing states of the smart watch, the antenna signal processing circuit in the present embodiment further comprises a second switch element, wherein the second switch element comprises a controlling end, a movable contact and a plurality of stationary contacts. The antenna body comprises one signal feed point and a plurality of grounding points. The signal feed point of the antenna body is connected to the antenna tuning circuit. Each grounding point of the antenna body is connected to one corresponding stationary contact of the second switch element. The movable contact of the second switch element is grounded. The controlling end of the second switch element is connected to the microprocessor. The microprocessor controls the antenna body through a controlling signal to switch the grounding point which is grounded.

It should be noted that, in the present embodiment, when the antenna signal processing circuit adjusts the antenna performance of the smart watch by switching the tuning path of the antenna tuning circuit and switching the grounding point on the antenna body which is grounded, it needs to be designed in the designing stage that each wearing state of the smart watch corresponds to a specific tuning path and a specific grounding point. In other words, if in the present embodiment, it is determined that the possible wearing states of the smart watch are a free space state and a hand-worn state, the antenna tuning circuit should be designed to have at least two tuning paths, namely, a tuning path Rt1 and a tuning path Rt2, and there should be at least two grounding points, namely, a grounding point Gnd1 and a grounding point Gnd2 disposed on the antenna body, wherein the matching impedance of the tuning path Rt1 corresponds to the antenna body whose grounding point is the grounding point Gnd1, and the matching impedance of the tuning path Rt2 corresponds to the antenna body whose grounding point is the grounding point Gnd2. If it is determined that the smart watch is currently in the hand-worn state, the antenna tuning circuit should be switched to the tuning path Rt1, and the grounding point Gnd1 of the antenna body is switched to be grounded.

Further, it should be noted that, in actual uses, the antenna body may also comprise one grounding point and a plurality of signal feed points. At this point, the grounding point of the antenna body is grounded. Each signal feed point of the antenna body is connected to one corresponding stationary contact of the second switch element. The movable contact of the second switch element is connected to the antenna tuning circuit. The controlling end of the second switch element is connected to the microprocessor. The microprocessor controls the antenna body through a controlling signal to switch the signal feed point that is connected to the antenna tuning circuit.

The antenna signal processing process of the present embodiment will be described in detail by way of a particular embodiment. For convenience of explanation, it is assumed that the wearing states of the smart watch in the present particular embodiment include a free space state and a hand-worn state.

Figure 2:
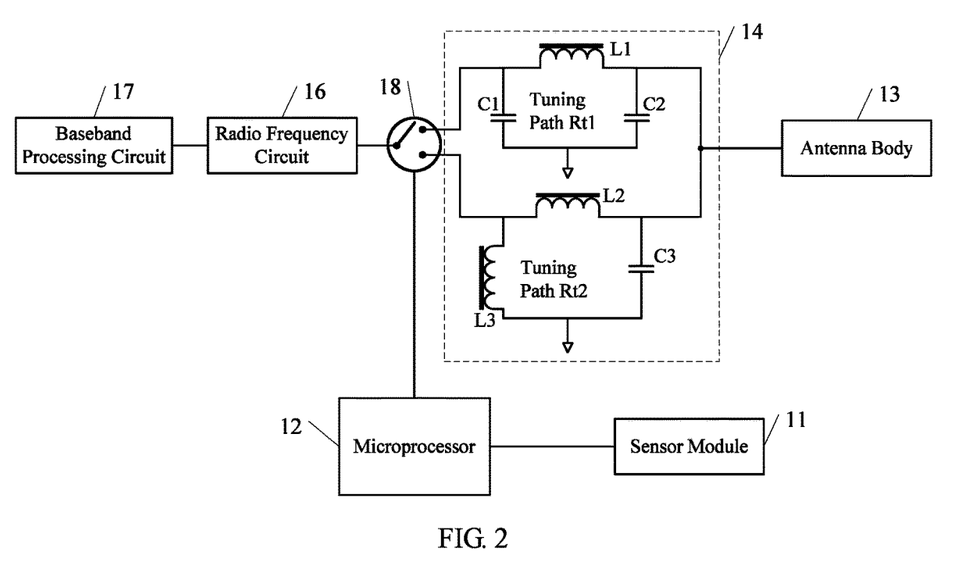
FIG. 2 is a schematic diagram of an antenna signal processing circuit according to a first embodiment of the present disclosure.

FIG. 2 is a schematic diagram of an antenna signal processing circuit according to an embodiment of the present disclosure. As shown in FIG. 2, the antenna signal processing circuit comprises: a sensor module 11, a microprocessor 12, an antenna body 13, an antenna tuning circuit 14 having a plurality of tuning paths, a radio frequency circuit 16, a baseband processing circuit 17, and a first switch element 18. The first switch element 18 comprises a controlling end, a movable contact and a stationary contact.

Based on the above assumptions of the present particular embodiment, correspondingly, the antenna tuning circuit 14 comprises two tuning paths, namely, a tuning path Rt1 and a tuning path Rt2. Exemplarily, as shown in FIG. 2, the tuning path Rt1 comprises an inductor L1 and capacitors C1, C2. One end of the inductor L1 is connected to one of the stationary contacts of the first switch element 18, and the other end of the inductor L1 is connected to the signal feed point of the antenna body. One end of the capacitor C1 and one end of the capacitor C2 are respectively connected to two ends of the inductor L1, and the other end of the capacitor C1 and the other end of the capacitor C2 are grounded. The tuning path Rt2 comprises inductors L2, L3 and a capacitor C3. One end of the inductor L2 is connected to another stationary contact of the first switch element 18, and the other end of the inductor L2 is connected to the signal feed point of the antenna body. One end of the inductor L3 and one end of the capacitor C3 are respectively connected to two ends of the inductor L2, and the other end of the inductor L3 and the other end of the capacitor C3 are grounded.

It should be noted that, FIG. 2 only exemplarily shows that the tuning path has a π-shaped circuit structure. The circuit structure of the tuning path is not limited in the present embodiment. In designing, the tuning path may also have a T-shaped circuit structure, a #-shaped circuit structure, or other structures.

The present embodiment further comprises a second switch element (not shown in FIG. 2). The second switch element also comprises a controlling end, a movable contact and a stationary contact. Correspondingly, the antenna body 13 comprises one signal feed point Feeding and two grounding points, namely, a grounding point Gnd1 and a grounding point Gnd2. Exemplarily, the signal feed point Feeding is located between the grounding point Gnd1 and the grounding point Gnd2.

In the present embodiment, one end of the tuning path Rt1 and one end of the tuning path Rt2 are respectively connected to the signal feed point Feeding of the antenna body 13, and the other end of the tuning path Rt1 and the other end of the tuning path Rt2 are respectively connected to the two stationary contacts of the first switch element 18. The grounding point Gnd1 and grounding point Gnd2 of the antenna body 13 are respectively connected to the two stationary contacts of the second switch element 19. The controlling ends of the first switch element 18 and the second switch element are both connected to one end of the microprocessor 12, and the other end of the microprocessor 12 is connected to the sensor module 11. The movable contact of the first switch element 18 is connected to one end of the radio frequency circuit 16, and the other end of the radio frequency circuit 16 is connected to the baseband processing circuit 17. The movable contact of the second switch element is grounded.

The microprocessor 12 of the present particular embodiment adjusts the antenna system performance of the smart watch based on the controlling signal as follows.

The sensor module 11 sends the detected proximity sensing signal to the microprocessor 12. The microprocessor 12 judges the current wearing state of the smart watch according to the proximity sensing signal, and generates a corresponding controlling signal according to the current wearing state of the smart watch.

As assumed above, the wearing state in the present particular embodiment is either a free space state or a hand-worn state, so the microprocessor 12 may generate a high level or a low level, and control the switching of the first switch element 18 and the second switch element by using the high level or the low level. At this point, the first switch element 18 and the second switch element may be a single-pole double-throw switch that is controlled by high level and low level inputted through the controlling end.

Exemplarily, assuming that the microprocessor 12 has determined that the smart watch is currently in the hand-worn state, correspondingly, the microprocessor 12 generates a high level to control the controlling ends of the first switch element 18 and the second switch element, control the movable contact of the first switch element 18 to be in contact with the stationary contact connected to the tuning path Rt1, and control the movable contact of the second switch element to be in contact with the stationary contact connected to the grounding point Gnd1; and then the matching impedance of the tuning path Rt1 is used to perform tuning processing on the antenna signal from the antenna body or the transmission signal from the baseband processing circuit, and antenna signals are transmitted and received according to the antenna performance (for example, transmitting/receiving power) corresponding to the grounding point Gnd1.

Second Embodiment

Figure 3:
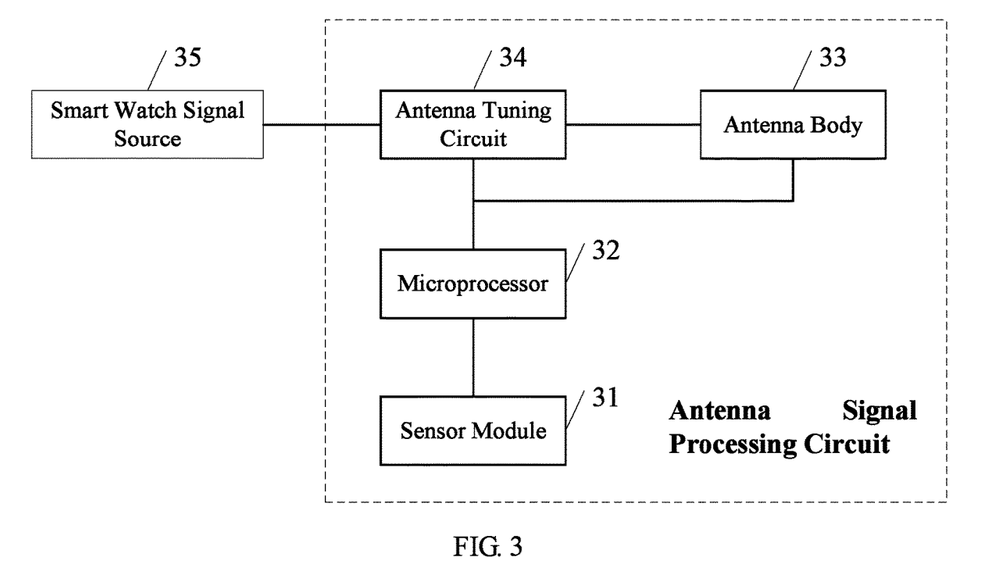
FIG. 3 is a schematic diagram of the structure of an antenna signal processing circuit according to a second embodiment of the present disclosure.

FIG. 3 is a block diagram of the structure of an antenna signal processing circuit according to the present embodiment. As shown in FIG. 3, the antenna signal processing circuit comprises: a sensor module 31, a microprocessor 32, an antenna body 33, and an antenna tuning circuit 34 having a plurality of tuning paths. The antenna body 33 comprises one signal feed point and a plurality of grounding points. The antenna tuning circuit comprises at least two tuning paths, the antenna body comprises at least two grounding points, and the quantity of tuning paths is equal to the quantity of grounding points.

The antenna tuning circuit 34 is connected between a smart watch signal source 35 and the signal feed point of the antenna body 33. The microprocessor 32 is connected to the sensor module 31, the antenna tuning circuit 34 and the antenna body 33 respectively.

The sensor module 31 sends the detected proximity sensing signal to the microprocessor 32. The microprocessor 32 receives the proximity sensing signal, and obtains a controlling signal according to the proximity sensing signal, to through the controlling signal control the antenna tuning circuit to switch to the corresponding tuning path and control the antenna body to switch the corresponding grounding point to ground.

The sensor module comprises one or more of a distance sensor, a temperature sensor and an acceleration sensor. Correspondingly, the proximity sensing signal is one or more of a distance signal, a temperature signal and an acceleration signal.

In the present embodiment, by providing the sensor module, the wearing state of the smart watch is determined by using the proximity sensing signal detected by the sensor module, and then the antenna tuning circuit is switched to a tuning path corresponding to the wearing state, the antenna body is switched to a grounding point corresponding to the wearing state, so that the antenna system of the smart watch is automatically adapted to the current wearing state, the antenna performance of the antenna system of the smart watch in the current wearing state is ensured to be optimal, and the quality of antenna signals is improved.

It should be noted that, in the present embodiment, one tuning path of the antenna tuning circuit corresponds to one grounding point of the antenna body, and one tuning path and the grounding point corresponding to the tuning path jointly correspond to one wearing state of the smart watch. In other words, the tuning paths of the antenna tuning circuit one-to-one correspond to the grounding points of the antenna body, and the wearing states of the smart watch one-to-one correspond to the tuning paths and the grounding points. In implementing, the possible wearing state of the smart watch should be determined firstly (for example, by experimental statistics), and then the locations of each grounding point on the antenna body and the matching impedances of each tuning path of the antenna tuning circuit are determined, so that one tuning path and one grounding point correspond to one wearing state, which ensures that the antenna performance of the antenna system of the smart watch is optimal in each wearing state.

In an implementation of the present embodiment, the antenna signal processing circuit further comprises a first switch element and a second switch element. Both of the first switch element and the second switch element include a controlling end, a movable contact and a plurality of stationary contacts.

The movable contact of the first switch element is connected to the smart watch signal source. Each stationary contact of the first switch element is connected to one corresponding tuning path of the antenna tuning circuit. The controlling end of the first switch element is connected to the microprocessor. The movable contact of the second switch element is grounded. Each stationary contact of the second switch element is connected to one corresponding grounding point of the antenna body. The controlling end of the second switch element is connected to the microprocessor.

The microprocessor controls the switching of the first switch element and the second switch element through the controlling ends of the first switch element and the second switch element.

By providing the switch elements to assist the microprocessor in controlling the antenna tuning circuit and the antenna body, the circuit is simple to implement and has few components, and will not occupy too much installation space of the smart watch.

In actual uses, the antenna signal processing circuit further comprises a radio frequency circuit and a baseband processing circuit. The radio frequency circuit is respectively connected to the baseband processing circuit and the movable contact of the first switch element. The baseband processing circuit is connected to the smart watch signal source. The baseband processing circuit, the radio frequency circuit, the antenna tuning circuit and the antenna body form a radio frequency path of the antenna signal. The transmission signal of the smart watch signal source is transmitted through the radio frequency path, and the antenna signal received by the antenna body is transmitted to the smart watch through the radio frequency path.

The antenna signal processing process of the present embodiment will be described in detail by way of a particular embodiment. For convenience of explanation, it is assumed that the wearing states of the smart watch in the present particular embodiment include a free space state and a hand-worn state.

Figure 4:
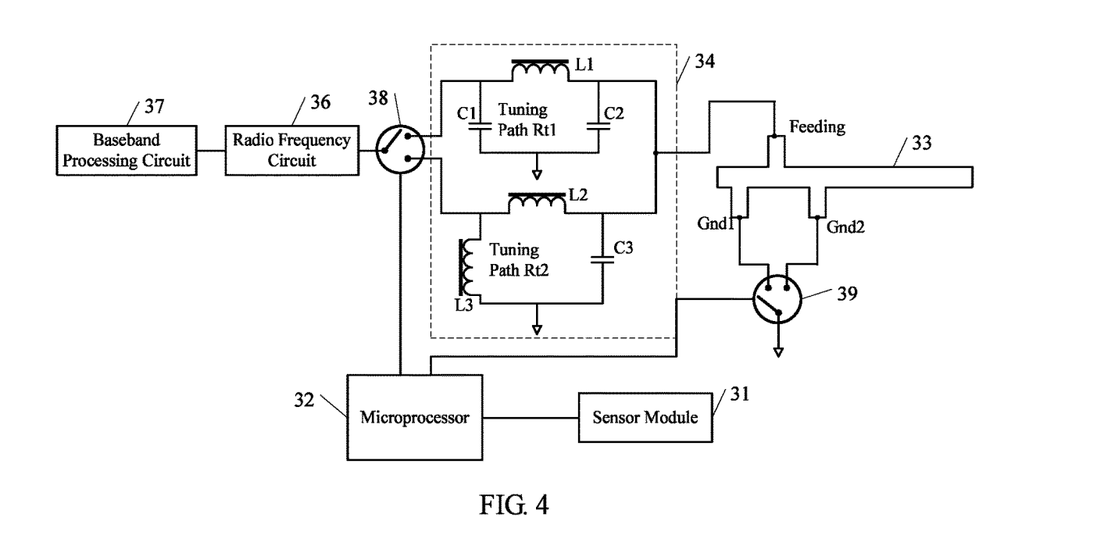
FIG. 4 is a schematic diagram of an antenna signal processing circuit according to a second embodiment of the present disclosure.

FIG. 4 is a schematic diagram of an antenna signal processing circuit according to the present embodiment. As shown in FIG. 4, the antenna signal processing circuit comprises: a sensor module 31, a microprocessor 32, an antenna body 33, an antenna tuning circuit 34 having a plurality of tuning paths, a radio frequency circuit 36, a baseband processing circuit 37, a first switch element 38 and a second switch element 39. Both of the first switch element 38 and the second switch element 39 comprise a controlling end, a movable contact and a stationary contact.

Based on the above assumptions of the present particular embodiment, correspondingly, the antenna tuning circuit 34 comprises two tuning paths, namely, a tuning path Rt1 and a tuning path Rt2. Exemplarily, as shown in FIG. 4, the tuning path Rt1 comprises an inductor L1 and capacitors C1, C2. One end of the inductor L1 is connected to one of the stationary contacts of the first switch element 38, and the other end of the inductor L1 is connected to the signal feed point of the antenna body. One end of the capacitor C1 and one end of the capacitor C2 are respectively connected to two ends of the inductor L1, and the other end of the capacitor C1 and the other end of the capacitor C2 are grounded. The tuning path Rt2 comprises inductors L2, L3 and a capacitor C3. One end of the inductor L2 is connected to another stationary contact of the first switch element 38, and the other end of the inductor L2 is connected to the signal feed point of the antenna body. One end of the inductor L3 and one end of the capacitor C3 are respectively connected to two ends of the inductor L2, and the other end of the inductor L3 and the other end of the capacitor C3 are grounded.

It should be noted that, FIG. 4 only exemplarily shows that the tuning path has a π-shaped circuit structure. The circuit structure of the tuning path is not limited in the present embodiment. In designing, the tuning path may also have a T-shaped circuit structure, a #-shaped circuit structure, or other structures.

Still based on the above assumptions of the present particular embodiment, correspondingly, the antenna body 33 comprises one signal feed point Feeding and two grounding points, namely, a grounding point Gnd1 and a grounding point Gnd2. Exemplarily, as shown in FIG. 4, the signal feed point Feeding is located between the grounding point Gnd1 and the grounding point Gnd2. It should be noted that, FIG. 4 only exemplarily shows the locations of the two grounding points and the signal feed point on the antenna body, and the shape of the antenna body and the locations of the grounding points and the signal feed point on the antenna body are not limited in the present embodiment.

In the present embodiment, one end of the tuning path Rt1 and one end of the tuning path Rt2 are respectively connected to the signal feed point Feeding of the antenna body 33. The other end of the tuning path Rt1 and the other end of the tuning path Rt2 are respectively connected to the two stationary contacts of the first switch element 38. The grounding point Gnd1 and grounding point Gnd2 of the antenna body 33 are respectively connected to the two stationary contacts of the second switch element 39. Both of the controlling ends of the first switch element 38 and the second switch element 39 are connected to one end of the microprocessor 32, and the other end of the microprocessor 32 is connected to the sensor module 31. The movable contact of the first switch element 38 is connected to one end of the radio frequency circuit 36, and the other end of the radio frequency circuit 36 is connected to the baseband processing circuit 37. The movable contact of the second switch element 39 is grounded.

The microprocessor 32 of the present particular embodiment adjusts the antenna system performance of the smart watch based on the controlling signal as follows.

The sensor module 31 sends the detected proximity sensing signal to the microprocessor 32. The microprocessor 32 judges the current wearing state of the smart watch according to the proximity sensing signal, and generates a corresponding controlling signal according to the current wearing state of the smart watch.

As assumed above, the wearing state in the present particular embodiment is either a free space state or a hand-worn state, so the microprocessor 32 may generate a high level or a low level, and control the switching of the first switch element 38 and the second switch element 39 by using the high level or the low level. At this point, the first switch element 38 and the second switch element 39 may be a single-pole double-throw switch that is controlled by high level and low level inputted through the controlling end.

Exemplarily, assuming that the microprocessor 32 has determined that the smart watch is currently in the hand-worn state, correspondingly, the microprocessor 32 generates a high level to control the controlling ends of the first switch element 38 and the second switch element 39, control the movable contact of the first switch element 38 to be in contact with the stationary contact connected to the tuning path Rt1, and control the movable contact of the second switch element 39 to be in contact with the stationary contact connected to the grounding point Gnd1; and then the matching impedance of the tuning path Rt1 is used to perform tuning processing on the antenna signal from the antenna body or the transmission signal from the baseband processing circuit, and antenna signals are transmitted and received according to the antenna performance (for example, transmitting/receiving power) corresponding to the grounding point Gnd1.

It should be noted that, the antenna body 33 in FIG. 4 may also comprise one grounding point and two signal feed points. At this point, the grounding point of the antenna body is grounded, and the two signal feed points of the antenna body are respectively connected to the two stationary contacts of the second switch element. The movable contact of the second switch element is connected to the antenna tuning circuit, and the controlling end of the second switch element is connected to the microprocessor.

Third Embodiment

Figure 5:
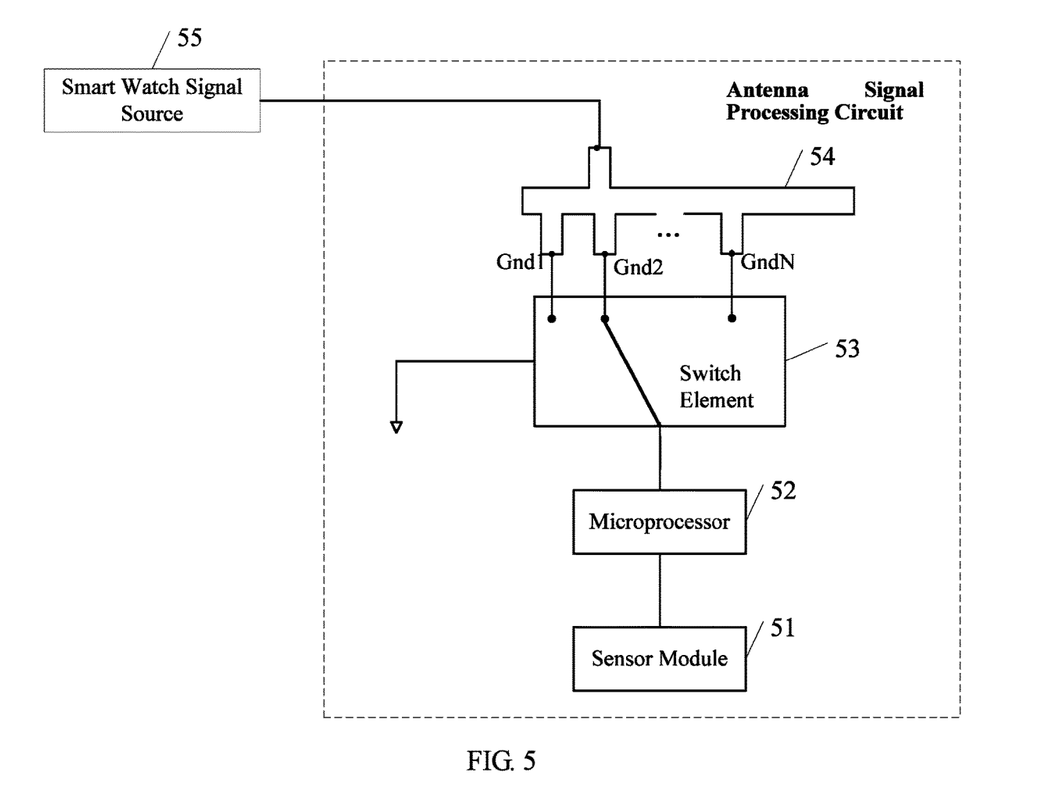
FIG. 5 is a block diagram of the structure of an antenna signal processing circuit according to a third embodiment of the present disclosure.

FIG. 5 is a block diagram of the structure of an antenna signal processing circuit according to the present embodiment. As shown in FIG. 5, the antenna signal processing circuit comprises: a sensor module 51, a microprocessor 52, a switch element 53, and an antenna body 54. The antenna body 54 comprises one signal feed point and N grounding points, and the switch element 53 comprises a controlling end, a movable contact and N stationary contacts, wherein N is a natural number greater than or equal to 2.

The signal feed point of the antenna body 54 is connected to a smart watch signal source 55. Each grounding point of the antenna body 54 is connected to one corresponding stationary contact of the switch element 53. The movable contact of the switch element 53 is grounded. The microprocessor 52 is connected to the sensor module 51 and the controlling end of the switch element 53 respectively.

The sensor module 51 sends the detected proximity sensing signal to the microprocessor. The microprocessor 52 receives the proximity sensing signal, obtains a controlling signal according to the proximity sensing signal, to control through the controlling signal the switch element 53 to switch the stationary contact that is connected to the movable contact, to cause the antenna body 54 to switch the grounding point which is grounded.

The sensor module 51 comprises one or more of a distance sensor, a temperature sensor and an acceleration sensor. Correspondingly, the proximity sensing signal is one or more of a distance signal, a temperature signal and an acceleration signal.

It should be noted that, in the present embodiment, one grounding point of the antenna body corresponds to one wearing state of the smart watch. The relative positional relation between the grounding point and the signal feed point on the antenna body will affect the performance of the antenna body, such as the transmitting and receiving powers of the antenna body, the quality of the transmitted and received signals, etc. Therefore, in designing the grounding points on the antenna body, the possible wearing state of the smart watch should be determined firstly (for example, by experimental statistics), and then a grounding point is provided at a specific location of the antenna body, so that each relative positional relation between the grounding point and the signal feed point on the antenna body corresponds to one wearing state of the smart watch.

In the present embodiment, by providing the sensor module, the wearing state of the smart watch is determined by using the proximity sensing signal detected by the sensor module, and then the antenna body is switched to a grounding point corresponding to the wearing state to ground, so that the antenna system of the smart watch is adapted to the current wearing state, the antenna system automatically works in the optimal state, and the quality of antenna signals is improved.

In actual uses, the antenna signal processing circuit further comprises a radio frequency circuit, a baseband processing circuit and an antenna tuning circuit. The antenna tuning circuit is respectively connected to the signal feed point of the antenna body and the radio frequency circuit, and the baseband processing circuit is respectively connected to the radio frequency circuit and the smart watch signal source. The baseband processing circuit, the radio frequency circuit, the antenna tuning circuit and the antenna body form a radio frequency path of the antenna signal. The transmission signal of the smart watch signal source is transmitted through the radio frequency path, and the antenna signal received by the antenna body is transmitted to the smart watch through the radio frequency path.

The antenna signal processing process of the present embodiment will be described in detail by way of a particular embodiment. For convenience of explanation, it is assumed that the wearing states of the smart watch in the present particular embodiment include a free space state and a hand-worn state.

Figure 6:
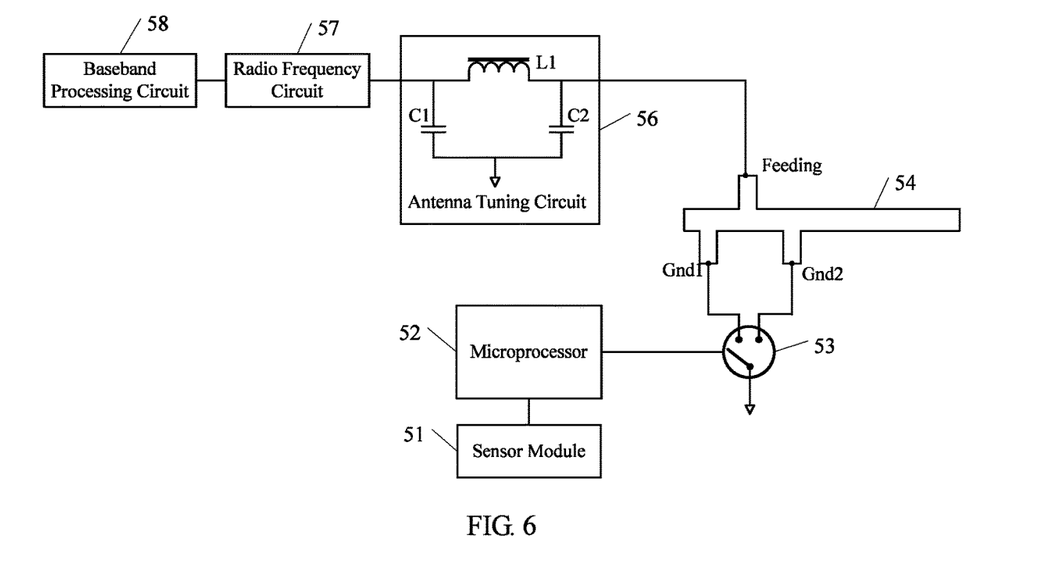
FIG. 6 is a schematic diagram of an antenna signal processing circuit according to a third embodiment of the present disclosure.

FIG. 6 is a schematic diagram of an antenna signal processing circuit according to the present embodiment. As shown in FIG. 6, the antenna signal processing circuit comprises: a sensor module 51, a microprocessor 52, a switch element 53, an antenna body 54, an antenna tuning circuit 56, a radio frequency circuit 57 and a baseband processing circuit 58.

Based on the above assumptions of the present particular embodiment, correspondingly, the antenna body 54 comprises one signal feed point Feeding and two grounding points, namely, a grounding point Gnd1 and a grounding point Gnd2. Exemplarily, as shown in FIG. 6, the signal feed point Feeding is located between the grounding point Gnd1 and the grounding point Gnd2. It should be noted that, FIG. 6 only exemplarily shows the locations of the two grounding points and the signal feed point on the antenna body, and the shape of the antenna body and the locations of the grounding points and the signal feed point on the antenna body are not limited in the present embodiment.

In the designing stage of the antenna body, it is designed so that the grounding point Gnd1 and the grounding point Gnd2 correspond to the optimal antenna performance in the free space state and the optimal antenna performance in the hand-worn state, respectively.

As exemplarily shown in FIG. 6, the antenna tuning circuit 56 comprises an inductor L1 and capacitors C1, C2. One end of the inductor L1 is connected to the signal feed point of the antenna body, and the other end of the inductor L1 is connected to the radio frequency circuit 57. One end of the capacitor C1 and one end of the capacitor C2 are respectively connected to two ends of the inductor L1, and the other end of the capacitor C1 and the other end of the capacitor C2 are grounded.

It should be noted that, FIG. 6 only exemplarily shows that the antenna tuning circuit has a π-shaped circuit structure, but in designing, the antenna tuning circuit may also have a #-shaped circuit structure, a T-shaped circuit structure, or other structures.

The microprocessor 52 of the present particular embodiment adjusts the antenna system performance of the smart watch based on the controlling signal as follows.

The sensor module 51 sends the detected proximity sensing signal to the microprocessor 52. The microprocessor 52 judges the current wearing state of the smart watch according to the proximity sensing signal, and generates a corresponding controlling signal according to the current wearing state of the smart watch.

As assumed above, the wearing state in the present particular embodiment is either a free space state or a hand-worn state, so the microprocessor 52 may generate a high level or a low level, and control the switching of the switch element 53 by using the high level or the low level. At this point, the switch element 53 may be a single-pole double-throw switch that is controlled by high level and low level inputted through the controlling end.

Exemplarily, assuming that the microprocessor 52 has determined that the smart watch is currently in the hand-worn state, correspondingly, the microprocessor 52 generates a high level to control the controlling end of the switch element 53, control the movable contact of the switch element 53 to be in contact with the stationary contact connected to the grounding point Gnd1; and then antenna signals are transmitted and received according to the antenna performance (for example, transmitting/receiving power) corresponding to the grounding point Gnd1.

In the present embodiment, by designing so that the grounding point Gnd1 and the grounding point Gnd2 correspond to the optimal antenna performance in the free space state and the optimal antenna performance in the hand-worn state, respectively, the microprocessor controls the selection of the grounding point of the antenna body according to the input of the sensor module and performs the adjustment of the antenna performance, so that the antenna works in the optimal state, and the quality of antenna signals is improved.

Fourth Embodiment

Figure 7:
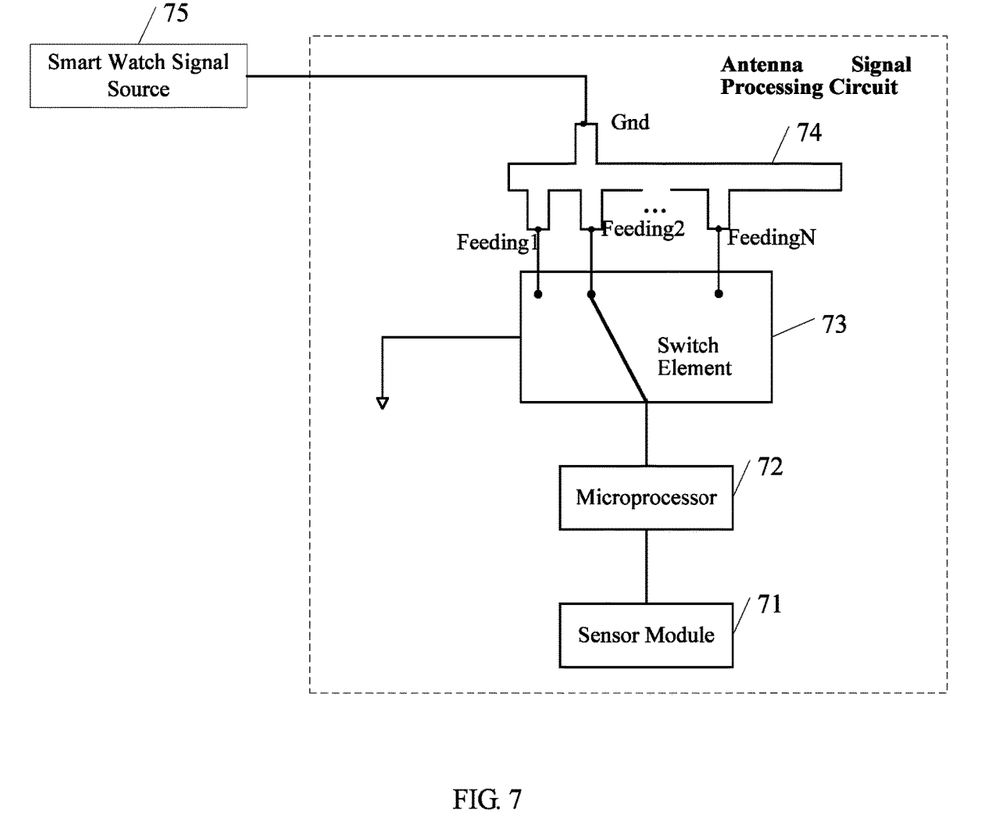
FIG. 7 is a schematic diagram of an antenna signal processing circuit according to a fourth embodiment of the present disclosure.

FIG. 7 is a block diagram of the structure of another antenna signal processing circuit according to the present embodiment. As shown in FIG. 7, the antenna signal processing circuit comprises a sensor module 71, a microprocessor 72, a switch element 73, and an antenna body 74. The antenna body 74 comprises one grounding point and N signal feed points, and the switch element 73 comprises a controlling end, a movable contact and N stationary contacts, wherein N is a natural number greater than or equal to 2.

The grounding point of the antenna body 74 is grounded. Each signal feed point of the antenna body 74 is connected to one corresponding stationary contact of the switch element 73. The movable contact of the switch element 73 is connected to a smart watch signal source 75. The microprocessor 72 is connected to the sensor module 71 and the controlling end of the switch element 73 respectively.

The sensor module 71 sends the detected proximity sensing signal to the microprocessor 72. The microprocessor 72 receives the proximity sensing signal, and obtains a controlling signal according to the proximity sensing signal, to control through the controlling signal the switch element 73 to switch the stationary contact that is connected to the movable contact, to cause the antenna body 74 to switch the signal feed point that is connected to the smart watch signal source.

The sensor module 71 comprises one or more of a distance sensor, a temperature sensor and an acceleration sensor. Correspondingly, the proximity sensing signal is one or more of a distance signal, a temperature signal and an acceleration signal.

It should be noted that, in the present embodiment, one signal feed point of the antenna body corresponds to one wearing state of the smart watch. The relative positional relation between the grounding point and the signal feed point on the antenna body will affect the performance of the antenna body, such as the transmitting and receiving powers of the antenna body, the quality of the transmitted and received signals, etc. Therefore, in designing the signal feed points on the antenna body, the possible wearing state of the smart watch should be determined firstly (for example, by experimental statistics), and then a signal feed point is provided at a specific location of the antenna body, so that each relative positional relation between the signal feed point and the grounding point on the antenna body corresponds to one wearing state of the smart watch.

In the present embodiment, by providing the sensor module, the wearing state of the smart watch is determined by using the proximity sensing signal detected by the sensor module, and then the antenna body is switched to a signal feed point corresponding to the wearing state to connect the smart watch signal source, so that the antenna system of the smart watch is adapted to the current wearing state, the antenna system automatically works in the optimal state, and the quality of antenna signals is improved.

In actual uses, the antenna signal processing circuit further comprises a radio frequency circuit, a baseband processing circuit and an antenna tuning circuit. The antenna tuning circuit is respectively connected to the movable contact of the switch element and the radio frequency circuit, and the baseband processing circuit is respectively connected to the radio frequency circuit and the smart watch signal source. The baseband processing circuit, the radio frequency circuit, the antenna tuning circuit and the antenna body form a radio frequency path of the antenna signal. The transmission signal of the smart watch signal source is transmitted through the radio frequency path, and the antenna signal received by the antenna body is transmitted to the smart watch through the radio frequency path.

The antenna signal processing circuit of the fourth embodiment is different from the antenna signal processing circuit of the third embodiment in that, the antenna body of the fourth embodiment comprises one grounding point and N signal feed points, and the antenna of the third embodiment comprises one signal feed point and N grounding points. The connection between the radio frequency circuit, the baseband processing circuit and the antenna tuning circuit in the antenna signal processing circuit of the present embodiment may refer to the third embodiment, and will not be repeated herein.

Fifth Embodiment

Based on the same technical concept as that of the first to fourth embodiments, a smart watch is provided in the present embodiment. It should be noted that, the antenna signal processing circuit in the present embodiment is not limited to being used in a smart watch, but may also be used in other wearable devices, such as a smart bracelet, a smart waistband, and smart glasses and other compact wearable devices. The mode of providing the antenna signal processing circuit in other wearable devices may refer to the present embodiment.

Figure 8:
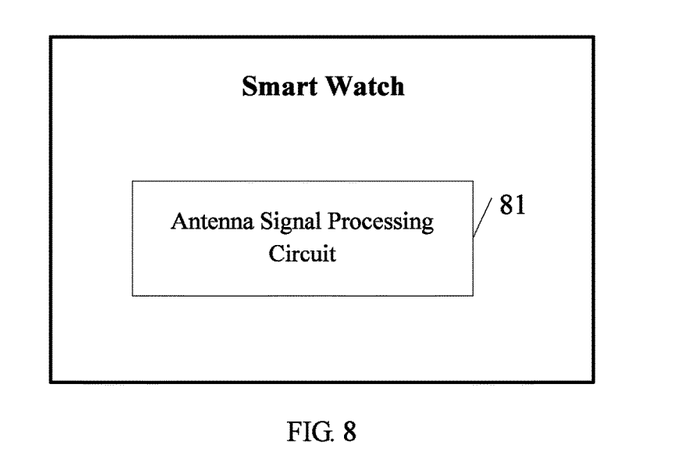
FIG. 8 is a block diagram of the structure of a smart watch according to a fifth embodiment of the present disclosure.

FIG. 8 is a block diagram of the structure of a smart watch according to the present embodiment. As shown in FIG. 8, the smart watch of the present embodiment comprises any one of the antenna signal processing circuits 81 of the first to fourth embodiments. The microprocessor in the antenna signal processing circuit 81 can detect the wearing state of the smart watch and adjust the antenna system of the smart watch.

The proximity sensor module in the antenna signal processing circuit 81 may be mounted on a watch case or a watch strap of the smart watch which is in contact with skin. In designing, it may be flexibly selected to dispose the proximity sensor module at the bottom of the watch case or at the bottom of the watch strap according to the design requirements. The bottom of the smart watch can be understood as the side of the case of the smart watch which is further away from the display.

The circuit structure of the antenna signal processing circuit 81 of the present embodiment may refer to the first to fourth embodiments, and will not be repeated herein.

In designing, in order to save the space of the smart watch and reduce the quantity of the components, the microprocessor in the present embodiment is the central controller CPU of the smart watch. In other words, the judging, calculating, controlling, etc. performed by the microprocessor in the antenna signal processing circuit are performed by the central controller CPU of the smart watch.

The central controller CPU of the smart watch is the computing core and controlling core of the smart watch. The central controller CPU may be connected to the components of the smart watch according to the function of the smart watch. For example, if the smart watch supports the touch screen function, the display of the smart watch may be a touch screen connected to the central controller.

Generally, the baseband processing circuit in the antenna signal processing circuit is substantially also a micro controller. Therefore, the baseband processing circuit in the antenna signal processing circuit may also be the central controller CPU of the smart watch.

Sixth Embodiment

Based on the same inventive concept as that of the first to fourth embodiments, the present embodiment provides an antenna signal processing method of a smart watch. A sensor module, an antenna body and a smart watch signal source are provided in the smart watch of the present embodiment.

Figure 9:
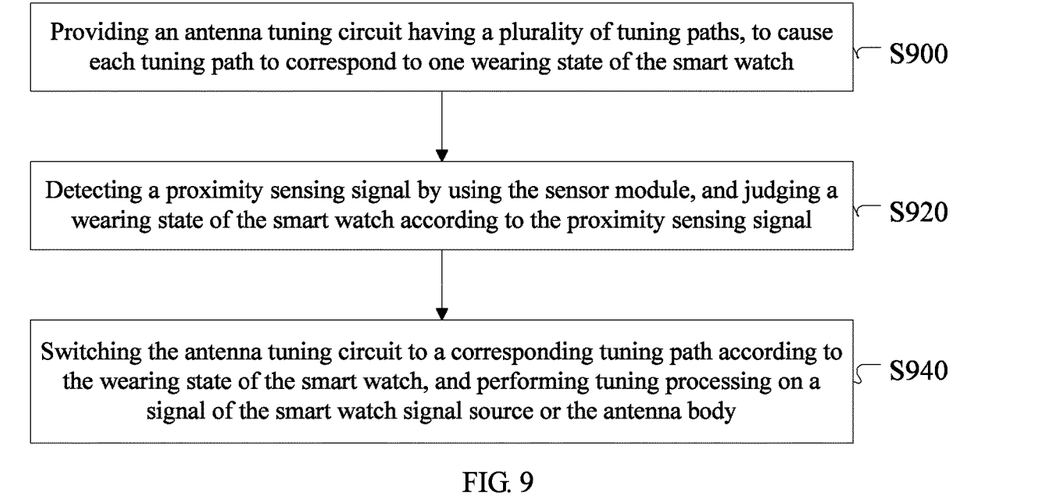
FIG. 9 is a flowchart of an antenna signal processing method according to a sixth embodiment of the present disclosure.

FIG. 9 is a flowchart of an antenna signal processing method according to the present embodiment. As shown in FIG. 9, the method comprises:

S900, providing an antenna tuning circuit having a plurality of tuning paths, to cause each tuning path to correspond to one wearing state of the smart watch;

S920, detecting a proximity sensing signal by using the sensor module, and judging a wearing state of the smart watch according to the proximity sensing signal; and S940, switching the antenna tuning circuit to a corresponding tuning path according to the wearing state of the smart watch, and performing tuning processing on a signal of the smart watch signal source or the antenna body.

In the present embodiment, the wearing state of the smart watch is determined by using the proximity sensing signal detected by the sensor module, and then the antenna tuning circuit is switched to a tuning path corresponding to the wearing state, so that the antenna system of the smart watch is adapted to the current wearing state, the antenna system of the smart watch can be automatically switched to the optimal state, thereby ensuring the quality of antenna signals and enhancing the user experience.

In order to further improve the antenna performance in different wearing states of the smart watch, the method in FIG. 9 further comprises: providing one signal feed point and a plurality of grounding points for the antenna body; and during or after the performing tuning processing on a signal of the smart watch signal source or the antenna body, the method further comprises: switching the grounding point of the antenna body to adjust a performance of the antenna body.

In an implementation of the present embodiment, the grounding point of the antenna body may be switched by:

providing a switch element for the antenna body, wherein the switch element comprises a controlling end, a movable contact and a plurality of stationary contacts, the movable contact is grounded, each stationary contact is connected to one grounding point, and each stationary contact corresponds to one wearing state of the smart watch; and controlling the switch element through the controlling end to switch the movable contact of the switch element.

The specific implementation of the steps in the present embodiment may refer to the specific contents of the first to fourth embodiments of the present disclosure, and will not be repeated herein.

In order to facilitate clearly describing the technical solutions of the present disclosure, the words "first", "second" and the like are used in the embodiments of the present disclosure to distinguish the same or similar items whose functions are substantially the same. The skilled in the art will understand that the words "first", "second" and the like do not limit the quantity and execution order.

The above description is merely particular embodiments of the present disclosure. The skilled in the art may make other improvements or modifications on the basis of the foregoing embodiments according to the teachings disclosed herein. It should be understood by the skilled in the art that the above specific description is only for better explaining the present disclosure, and the protection scope of the present disclosure should be determined by the protection scope of the claims.

What is claimed is:

1. An antenna signal processing circuit of a smart watch, wherein the antenna signal processing circuit comprises: a sensor module, a microprocessor, an antenna body, and an antenna tuning circuit having a plurality of tuning paths; the antenna signal processing circuit further comprises a first switch element, wherein the first switch element comprises a controlling end, a movable contact and a plurality of stationary contacts; the antenna tuning circuit is connected between a smart watch signal source and the antenna body; the microprocessor is respectively connected to the sensor module and the antenna tuning circuit; the movable contact of the first switch element is connected to the smart watch signal source, each stationary contact of the first switch element is connected to one corresponding tuning path of the antenna tuning circuit, and the controlling end of the first switch element is connected to the microprocessor; the microprocessor controls the switching of the first switch element through the controlling end, so that the smart watch signal source is conductively connected to the corresponding tuning path; the sensor module sends a detected proximity sensing signal to the microprocessor; and the microprocessor receives the proximity sensing signal, and obtains a controlling signal, to control the antenna tuning circuit to switch the tuning path and perform tuning processing on a signal from the smart watch signal source or the antenna body.

2. The antenna signal processing circuit according to claim 1, wherein the antenna signal processing circuit further comprises a radio frequency circuit and a baseband processing circuit;

the radio frequency circuit is respectively connected to the baseband processing circuit and the movable contact of the first switch element;

the baseband processing circuit is connected to the smart watch signal source; and the baseband processing circuit, the radio frequency circuit, the antenna tuning circuit and the antenna body form a radio frequency path of an antenna signal; and a transmission signal of the smart watch signal source is transmitted through the radio frequency path, and the antenna signal received by the antenna body is transmitted to the smart watch through the radio frequency path.

3. The antenna signal processing circuit according to claim 2, wherein the antenna signal processing circuit further comprises a second switch element, wherein the second switch element comprises a controlling end, a movable contact and a plurality of stationary contacts;

the antenna body comprises one signal feed point and a plurality of grounding points;

the signal feed point of the antenna body is connected to the antenna tuning circuit, each grounding point of the antenna body is connected to one corresponding stationary contact of the second switch element, the movable contact of the second switch element is grounded, and the controlling end of the second switch element is connected to the microprocessor; and the microprocessor controls the antenna body through a controlling signal to switch the grounding point which is grounded.

4. The antenna signal processing circuit according to claim 1, wherein the antenna tuning circuit comprises a first tuning path and a second tuning path, and matching impedances of the first tuning path and the second tuning path are different; and the first switch element is a single-pole double-throw switch that is controlled by high level and low level inputted through the controlling end.

5. The antenna signal processing circuit according to claim 4, wherein the first tuning path comprises an inductor L1 and capacitors C1, C2, one end of the inductor L1 is connected to one of the stationary contacts of the single-pole double-throw switch, the other end of the inductor L1 is connected to the antenna body, one end of the capacitor C1 and one end of the capacitor C2 are respectively connected to two ends of the inductor L1, and the other end of the capacitor C1 and the other end of the capacitor C2 are grounded; and the second tuning path comprises inductors L2, L3 and a capacitor C3, one end of the inductor L2 is connected to another stationary contact of the single-pole double-throw switch, the other end of the inductor L2 is connected to the antenna body, one end of the inductor L3 and one end of the capacitor C3 are respectively connected to two ends of the inductor L2, and the other end of the inductor L3 and the other end of the capacitor C3 are grounded.

6. The antenna signal processing circuit according to claim 1, wherein the sensor module comprises one or more of a distance sensor, a temperature sensor and an acceleration sensor.

7. An antenna signal processing circuit of a smart watch, wherein the antenna signal processing circuit comprises: a sensor module, a microprocessor, a switch element and an antenna body;

the antenna body comprises one signal feed point and at least two grounding points;

the switch element comprises a controlling end, a movable contact and at least two stationary contacts;

the signal feed point of the antenna body is connected to a smart watch signal source, each grounding point of the antenna body is connected to one corresponding stationary contact of the switch element, the movable contact of the switch element is grounded, and the microprocessor is respectively connected to the sensor module and the controlling end of the switch element;

the sensor module sends a detected proximity sensing signal to the microprocessor; and the microprocessor receives the proximity sensing signal, and obtains a controlling signal, to control the switch element to switch the stationary contact that is connected to the movable contact, to cause the antenna body to switch the grounding point which is grounded.

8. The antenna signal processing circuit according to claim 7, wherein the antenna signal processing circuit further comprises a radio frequency circuit, a baseband processing circuit and an antenna tuning circuit;

the antenna tuning circuit is respectively connected to the signal feed point of the antenna body and the radio frequency circuit, and the baseband processing circuit is respectively connected to the radio frequency circuit and the smart watch signal source;

the baseband processing circuit, the radio frequency circuit, the antenna tuning circuit and the antenna body form a radio frequency path of the antenna signal; and a transmission signal of the smart watch signal source is transmitted through the radio frequency path, and the antenna signal received by the antenna body is transmitted to the smart watch through the radio frequency path.

9. The antenna signal processing circuit according to claim 7, wherein the antenna body comprises one signal feed point Feeding and two grounding points, the signal feed point Feeding is located between the two grounding points.

10. An antenna signal processing circuit of a smart watch, wherein the antenna signal processing circuit comprises: a sensor module, a microprocessor, a switch element and an antenna body;

the antenna body comprises one grounding point and at least two signal feed points;

the switch element comprises a controlling end, a movable contact and at least two stationary contacts;

the grounding point of the antenna body is grounded, each signal feed point of the antenna body is connected to one corresponding stationary contact of the switch element, the movable contact of the switch element is connected to a smart watch signal source, and the microprocessor is respectively connected to the sensor module and the controlling end of the switch element;

the sensor module sends a detected proximity sensing signal to the microprocessor; and the microprocessor receives the proximity sensing signal, and obtains a controlling signal, to control the switch element to switch the stationary contact that is connected to the movable contact, to cause the antenna body to switch the signal feed point that is connected to the smart watch signal source.

11. The antenna signal processing circuit according to claim 10, wherein the antenna signal processing circuit further comprises a radio frequency circuit, a baseband processing circuit and an antenna tuning circuit;

the antenna tuning circuit is respectively connected to the movable contact of the switch element and the radio frequency circuit, and the baseband processing circuit is respectively connected to the radio frequency circuit and the smart watch signal source;

the baseband processing circuit, the radio frequency circuit, the antenna tuning circuit and the antenna body form a radio frequency path of the antenna signal; and a transmission signal of the smart watch signal source is transmitted through the radio frequency path, and the antenna signal received by the antenna body is transmitted to the smart watch through the radio frequency path.

* * * * *